US012503359B2

(12) United States Patent
Tan et al.

(10) Patent No.: US 12,503,359 B2
(45) Date of Patent: Dec. 23, 2025

(54) MICROPHONE

(71) Applicant: AAC ACOUSTIC TECHNOLOGIES (SHENZHEN) CO., LTD., Shenzhen (CN)

(72) Inventors: Siewseong Tan, Singapore (SG); Yangmeng Chang, Singapore (SG); Tiongkee Chua, Singapore (SG); Jingxin Pu, Shenzhen (CN); Rui Zhang, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 488 days.

(21) Appl. No.: 17/994,024

(22) Filed: Nov. 25, 2022

(65) Prior Publication Data

US 2023/0339744 A1   Oct. 26, 2023

Related U.S. Application Data

(63) Continuation of application No. PCT/CN2022/094172, filed on May 20, 2022.

(30) Foreign Application Priority Data

Apr. 20, 2022   (CN) .......................... 202220932908.6

(51) Int. Cl.
*B81B 7/02* (2006.01)
*B81B 3/00* (2006.01)

(52) U.S. Cl.
CPC ................ *B81B 7/02* (2013.01); *B81B 3/007* (2013.01); *B81B 2201/0257* (2013.01); *B81B 2207/012* (2013.01); *H04R 2201/003* (2013.01)

(58) Field of Classification Search
CPC ... B81B 7/02; B81B 3/007; B81B 2201/0257; B81B 2207/012; H04R 2201/003; H04R 17/02; H04R 19/005; H04R 19/04; H04R 2410/03; H04R 2430/03; H04R 2499/11; H04R 3/00; H04R 1/04
See application file for complete search history.

(56) References Cited

U.S. PATENT DOCUMENTS

2012/0093346 A1\* 4/2012 Feiertag ............... H04R 19/005
381/174
2014/0079254 A1\* 3/2014 Kim ........................ H04R 3/00
381/174

(Continued)

FOREIGN PATENT DOCUMENTS

CN           102186128 A  \*  9/2011  .............. H04R 1/08

*Primary Examiner* — Oyesola C Ojo
(74) *Attorney, Agent, or Firm* — Wiersch Law Group

(57) ABSTRACT

The present invention provides a microphone, including a protection structure with a containment space, and an ASIC chip and a MEMS microphone chip accommodated in the containment space. The microphone also includes a low pass filter circuit. The low pass filter circuit is connected between the ASIC chip and the MEMS microphone chip, or the low pass filter circuit is integrated in the ASIC chip. The high frequency cutoff frequency of the low pass filter circuit is greater than 20 khz, so that by setting the low pass filter circuit, the interference of the ultrasonic frequency band can be filtered, the noise can be reduced, and the audio quality can be improved.

7 Claims, 2 Drawing Sheets

(56) References Cited

U.S. PATENT DOCUMENTS

| | | | |
|---|---|---|---|
| 2015/0251898 A1* | 9/2015 | Vos | B81C 1/0023 |
| | | | 257/416 |
| 2018/0054669 A1* | 2/2018 | Zheng | H04R 1/2876 |
| 2018/0115811 A1* | 4/2018 | Zhang | H04R 1/086 |
| 2018/0167730 A1* | 6/2018 | Parker | H04R 19/005 |
| 2019/0230446 A1* | 7/2019 | Schultz | H04R 19/04 |
| 2019/0306617 A1* | 10/2019 | Straeussnigg | H03M 1/06 |
| 2020/0055726 A1* | 2/2020 | Deas | B81B 7/0019 |
| 2020/0092658 A1* | 3/2020 | Zou | H04R 19/005 |
| 2020/0162830 A1* | 5/2020 | Berthelsen | H04R 3/04 |
| 2022/0408208 A1* | 12/2022 | Chen | H04R 17/02 |
| 2023/0254635 A1* | 8/2023 | Leahy | H04R 1/2846 |
| | | | 381/113 |

* cited by examiner

MICROPHONE

FIELD OF THE PRESENT DISCLOSURE

The present invention relates to the field of electro-acoustic conversion, in particular to a microphone.

DESCRIPTION OF RELATED ART

The MEMS (microelectromechanical systems, microelectromechanical systems) microphone is a microphone based on MEMS sensor technology. With improved noise cancellation performance, good radio frequency performance and electromagnetic interference suppression ability, it is widely used in various electronic products such as smart phones, wire-controlled headphones, tablets and notebooks.

At present, due to the wide application of high-power ultrasonic transceivers, the overload of the microphone in this acoustic frequency band causes noise. The level of the noise is related to the power of the ultrasonic transceiver itself, the distance from the mobile phone's microphone, and the sensitivity of the microphone in this frequency band. In the related art, although the 48 khz sampling of the codec will filter the sound of the frequency of 24 khz and above. However, the noise has been generated inside the microphone and extended to low frequencies, resulting in a small but obvious pop sound.

Therefore, it is necessary to provide a new microphone to solve the above technical problems.

SUMMARY OF THE PRESENT INVENTION

The present invention is to provide a microphone, which can filter out ultrasonic frequency interference by setting a low pass filter circuit.

Accordingly, the present invention provides a microphone, including: a protection structure with a containment space; an ASIC chip and a MEMS microphone chip accommodated in the containment space; and a low pass filter circuit electrically connecting the ASIC chip to the MEMS microphone chip. A high frequency cutoff frequency of the low pass filter circuit is greater than 20 khz.

In addition, the low pass filter circuit is integrated in the ASIC chip, and an input end of the low pass filter circuit serves as an input end of the ASIC chip.

In addition, the low pass filter circuit includes a RC circuit.

In addition, the low pass filter circuit further includes an arithmetic amplifying circuit connected to the RC circuit.

In addition, the low pass filter circuit includes a field effect tube.

In addition, the low pass filter circuit includes a bipolar junction transistor.

In addition, the low pass filter circuit includes a diode.

In addition, the microphone includes a sound hole provided throughout the protection structure, wherein the protection structure includes a circuit board and a housing forming the containment space together with the circuit board.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

Figure 1:
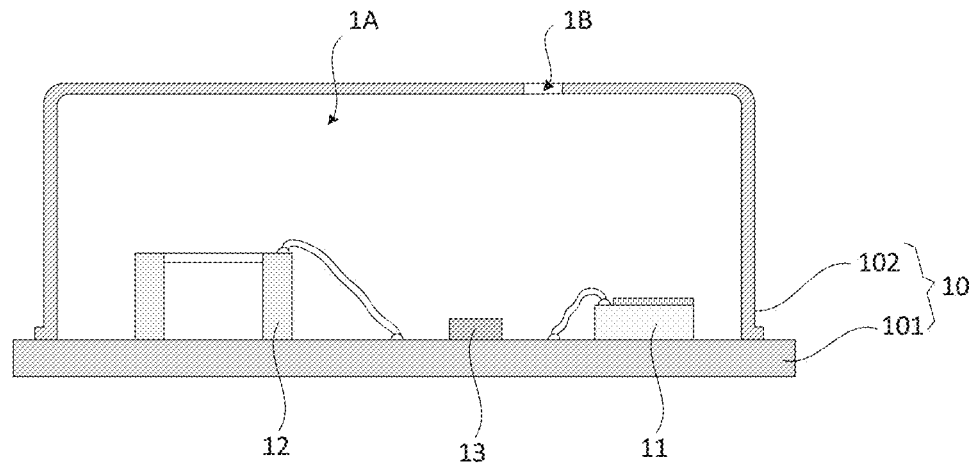
FIG. 1 is a cross-sectional view of a microphone provided by an embodiment of the present invention.

Please refer to FIG. 1, the present invention of the microphone includes a protection structure 10 having a containment space 1a, and an ASIC chip 11 and a MEMS microphone chip 12 accommodated in the containment space 1a. Further, the protection structure 10 is provided with a sound hole 1b through it. The protection structure 10 includes a circuit board 101 and a housing 102 covering the circuit board 101 to form the containment space 1a.

Figure 2:
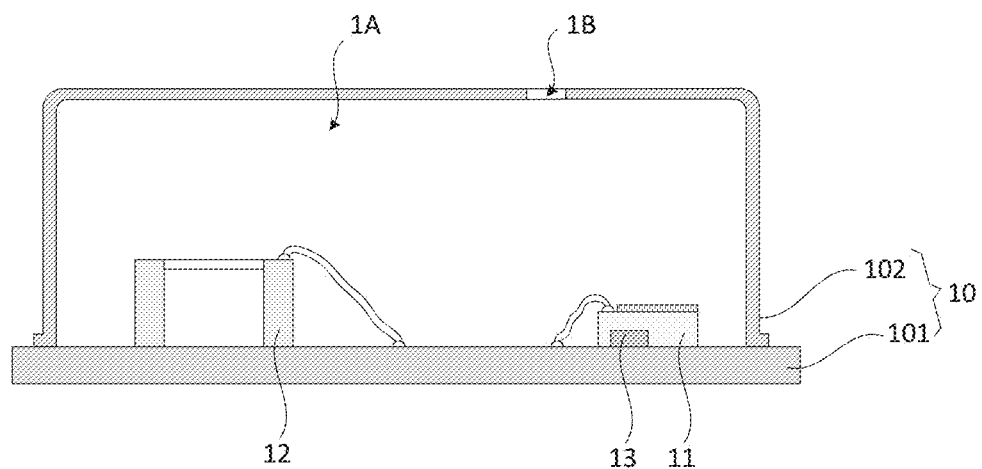
FIG. 2 is a cross-sectional view of a microphone provided by another embodiment of the present invention.

Wherein, the microphone further includes a low pass filter circuit 13, as shown in FIG. 1, the low pass filter circuit 13 is connected between the ASIC chip 11 and the MEMS microphone chip 12. Alternatively, as shown in FIG. 2, the low pass filter circuit 13 is integrated in the ASIC chip 12. Further, when the low pass filter circuit 13 is integrated in the ASIC chip 12, the input end of the low pass filter circuit 13 can be used as the input end of the ASIC chip 12.

Figure 3:
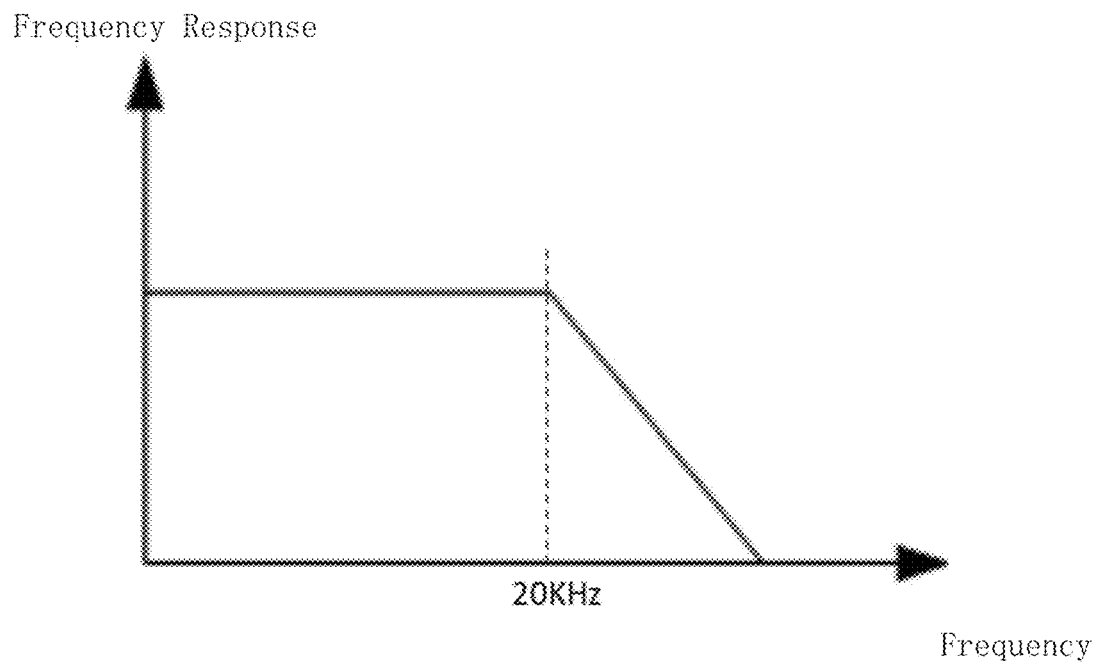
FIG. 3 shows a working frequency waveform of a low pass filter circuit.

Wherein, as shown in FIG. 3, the high frequency cutoff frequency of the low pass filter circuit 13 is greater than 20 khz.

In some embodiments, the low pass filter circuit 13 includes a RC circuit. For example, the RC circuit can be a first-order RC filter circuit, that is, a filter circuit composed of a capacitor and a resistance, or the RC circuit can also be a multi-order filter circuit.

Further, the low pass filter circuit 13 may further include an arithmetic amplifying circuit connected to the rc circuit.

In other embodiments, the low pass filter circuit 13 includes a field effect tube, that is, the low pass filter circuit 13 uses a field effect tube to realize the filter function.

Alternatively, in other embodiments, the low pass filter circuit 13 includes a bipolar junction transistor, that is, the low pass filter circuit 13 uses a bipolar junction transistor to implement the filter function.

Alternatively, in other embodiments, the low pass filter circuit 13 includes a diode, and the low pass filter circuit 13 uses a diode to implement the filter function.

Figure 4:
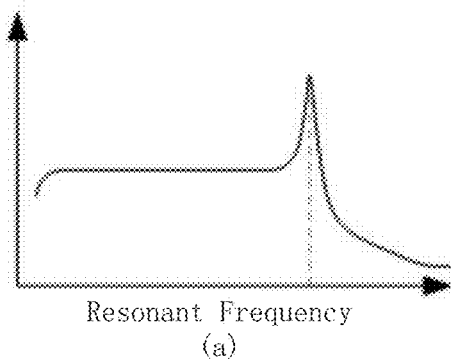
FIG. 4 shows a waveform of a sensitivity of the microphone before and after setting the low pass filter circuit.
Figure 4:
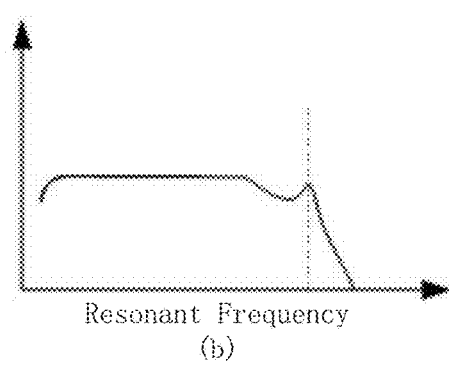

In the embodiment of the present invention, the low pass filter circuit 13 is provided between the ASIC chip 11 and the MEMS microphone chip 12 or the low pass filter circuit 13 is integrated in the ASIC chip 11. Through the function of the low pass filter circuit 13, the interference of the ultrasonic frequency band can be filtered, the noise can be reduced, and the audio quality can be improved. As shown in FIG. 4, FIG. 4(a) is the waveform view of the sensitivity changing with frequency when the low pass filter circuit 13 is not set on the microphone, and the FIG. 4(b) is the waveform of the sensitivity changing with frequency after the low pass filter circuit 13 is set on the microphone. From the comparison of FIGS. 4(*a*) and 4(*b*), it can be clearly seen that the ultrasonic frequency band in the sound signal has been greatly eliminated after the microphone is set with the low pass filter circuit 13, thereby greatly improving the audio quality.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A microphone, including:
    a protection structure with a containment space, comprising a circuit board and a housing forming the containment space together with the circuit board;
    an ASIC chip and a MEMS microphone chip accommodated in the containment space;
    a low pass filter circuit electrically connecting the ASIC chip to the MEMS microphone chip;
    wherein a high frequency cutoff frequency of the low pass filter circuit is greater than 20 khz;
    the ASIC chip, the MEMS microphone chip, and the low pass filter circuit are mounted on a surface of the circuit board facing the housing; the low pass filter circuit is located between the MEMS microphone chip and the ASIC chip; a sound hole is provided on the housing and oppositely arranged to the circuit board; the sound hole is malposed with the MEMS microphone chip, the ASIC chip and the low pass filter circuit viewing along a thickness direction of the circuit board.

2. The microphone as described in claim 1, wherein the low pass filter circuit includes a RC circuit.

3. The microphone as described in claim 2, wherein the low pass filter circuit further includes an arithmetic amplifying circuit connected to the RC circuit.

4. The microphone as described in claim 1, wherein the low pass filter circuit includes a field effect tube.

5. The microphone as described in claim 1, wherein the low pass filter circuit includes a bipolar junction transistor.

6. The microphone as described in claim 1, wherein the low pass filter circuit includes a diode.

7. The microphone as described in claim 1, wherein a thickness of the housing is smaller than a thickness of the circuit board.

* * * * *